United States Patent [19]

Wetzel

[11] Patent Number: 4,817,305
[45] Date of Patent: Apr. 4, 1989

[54] LAST FOR SHOE SHAFTS WHICH HAS A GENERALLY T-SHAPED GROOVE AND A SPRING-BIASED GENERALLY T-SHAPED PROFILE BAND THEREIN

[75] Inventor: Walter Wetzel, Achim, Fed. Rep. of Germany

[73] Assignee: Klöckner Ferromatik Desma GmbH, Malterdingen, Fed. Rep. of Germany

[21] Appl. No.: 126,179

[22] Filed: Nov. 27, 1987

[30] Foreign Application Priority Data

Nov. 27, 1986 [DE]  Fed. Rep. of Germany ....... 3640561

[51] Int. Cl.[4] ......................... A43D 3/00; A43D 65/02
[52] U.S. Cl. ................................. 12/133 R; 425/119
[58] Field of Search ............ 12/133 R, 133 B, 133 M, 12/138; 425/117, 119, 129.2; 264/244, 275; 249/83, 91

[56] References Cited

U.S. PATENT DOCUMENTS

| | | | |
|---|---|---|---|
| 1,842,719 | 1/1932 | Dunker | 425/119 |
| 3,474,496 | 10/1969 | Klee | 425/119 |
| 3,659,301 | 5/1972 | Auberry et al. | 12/133 |
| 4,455,274 | 6/1984 | Horney | 264/278 |

FOREIGN PATENT DOCUMENTS

| | | | |
|---|---|---|---|
| 2163455 | 10/1972 | Fed. Rep. of Germany . | |
| 289346 | 1/1979 | France | 425/119 |
| 260843 | 4/1947 | Switzerland . | |
| 0396403 | 1/1966 | Switzerland | 425/129.2 |
| 1186490 | 10/1985 | U.S.S.R. | 249/91 |

Primary Examiner—Steven N. Meyers
Attorney, Agent, or Firm—Watson, Cole, Grindle & Watson

[57] ABSTRACT

The last for a shoe shaft includes a groove which, in cross section, has a generally T-shaped configuration, a profile band mounted in the groove and which, in cross section, also has a generally T-shaped configuration, and a plurality of springs for biasing the profile band such that a stem part thereof is biased towards the mouth of the groove where the inlet portion thereof opens onto the surface of said last, the stem part contacting the shoe shaft opposite where the sealing edges of cooperable lateral mold parts will contact the shoe shaft when molding a sole to the shoe shaft. As a result, sole material is prevented from extruding past the sealing edges of the lateral mold parts onto the upper part of the shoe shaft.

12 Claims, 6 Drawing Sheets

LAST FOR SHOE SHAFTS WHICH HAS A GENERALLY T-SHAPED GROOVE AND A SPRING-BIASED GENERALLY T-SHAPED PROFILE BAND THEREIN

BACKGROUND OF THE INVENTION

The present invention relates to a last on which a shoe shaft can be mounted and which is cooperable with lateral mold parts and a bottom stamp for molding a sole onto the shoe shaft, the last having a groove therein which contains a profile band of flexible material, the profile band being capable of contacting the inside surface of the shoe shaft opposite the sealing edges of the lateral mold parts during molding of a sole thereon.

According to known technology, shoe shafts to which soles can be molded may comprise an upper part and an insole, or they may be formed of only an upper part. The upper part may consist of leather, fabric, laminated fabric, elastomer or synthetic material such as polyvinylchloride or polyurethane, and it may have a vamp or appliques sewn or stitched thereto. In molding soles to the shoe shafts, shoe soling devices with several work stations, constructed as round table installations, are generally used.

The work stations utilize at least one last, two lateral mold parts and at least one bottom stamp. In a working position, i.e., in the position in which a sole is molded to the shoe shaft, the lateral mold parts are in a locked position in which they enclose an opening into which at least one injection channel opens. The last with mounted shoe shaft is arranged between these lateral mold parts in a locked position, whereby it encloses, together with the lateral mold parts and the bottom stamp, the molding cavity for the sole to be molded. The sole material is introduced through the injection channel(s) into this molding cavity.

In general, the soles molded onto the shoe shafts include a wear resistant outer sole and a flexible intermediate sole. It is also possible to mold only outer soles onto the shoe shafts.

The molds for the work stations are made from sample molds. For the production of a new shoe model, the shoe maker provides the mold maker with pairs of shoe shafts for various shoe sizes. The mold builder then produces the sample molds for each pair of matching shoe shafts, which then serve as models for the molds to be made for the work stations. The sample molds and working molds are made with great precision so that, among other things, during the molding of the soles to the shoe shafts, the sole material injected into the mold cavities is distributed in such a manner that perfect soles having no engraving errors, and particularly no air bubbles, are formed.

Particular problems result from the fact that during the molding of the soles, the shoe shafts mounted on the lasts are supposed to rest with sufficient pressure against the sealing lips of the lateral mold parts to prevent an extrusion of sole material from the mold cavity past the sealing lips onto the upper part of the shoe, whereas on the other hand the surface pressure of the sealing lips against the upper part of the shoe is not so high that permanent pressure marks are left on the upper part of the shoe. Until now, only trade-offs were possible to deal with these two contradictory requirements, i.e., no satisfactory solution existed.

According to current procedures the undesirable extrusion has been simply tolerated, and after the molding of the soles the undesirable extrusion has been manually removed and, simultaneously, the damaged parts, particularly the delicate upper parts of shoes made from soft leather, retouched with colored pencils or the like. However, this manual procedure is very expensive and has only been done because shoes with visible pressure marks from the sealing lips on the upper part of the shoe were not salable and generally had to be rejected as waste.

Problems also result from the fact that shoe shafts made from leather can have varying thicknesses, not only one from another, but in various areas of the same shoe shaft. This is of particular concern if these thickness variations, generally in the range of a few tenths of a millimeter, are in the area of the sealing lips of the lateral mold parts.

Shoe shafts generally have a toe vamp and/or a heel vamp and/or lateral vamp against which the sealing lips of the lateral mold parts rest during the molding on of the soles. The vamp generally is sewn on or stitched and forms an edge at its end in an area of the shoe shaft where it is particularly easy for sole material to be extruded during the molding of the soles.

In general workers have made do by gluing aluminum strips on the last in these areas in order to at least reduce the extrusion or, with thicker vamps, a portion of the last in the area of the vamp has been removed. However, this processing of lasts has the special disadvantage that it cannot be used if, during the further molding on of soles, shoe shafts with other vamps or even without vamps are used. The use of adhesive strips is also considered to be a stop-gap measure because the vamp can never be stitched or sewn so exactly onto the shoe shafts that it will always be in the same position, so that during the molding on of the soles in indetermined successions, there may be more or less extrusion at various places.

On the other hand, it is known to use lasts which include a profile band of elastic material. See, for example, German Patent Publication No. 21 63 455. These lasts are made of one piece and have a continuous, closed track groove into which the profile band of a flexible material is inserted, the groove being located in the last opposite the sealing lips of the cooperating lateral mold parts. The lateral mold parts also have grooves with inserted profile bands. It is hereby only possible to utilize the molding capability of the profile band.

During the molding on of a sole onto a shoe shaft, the upper part of the shoe is clamped between the two profile bands and the upper part of the shoe sealed against the sole material. Due to the fact that the profile bands fill the grooves in which they are positioned, a secure sealing or a prevention of lasting impressions is only possible for slight tolerance deviations in the shoe shafts and generally fail altogether for shoe shafts with vamps.

In addition, these known lasts with profile bands inserted into grooves are made in one piece. However, two-part lasts are generally used, particularly in shoe soling machines constructed as round table installations. They have a toe part and a heel part, connected by a joint. With this construction of the lasts it is possible to imitate the foot motion when slipping into the shoe for the mounting of the shoe shafts and to thus prevent inadmissibly high expansion of the upper material, which, in general, leads to permanent loss of shape. This can be applied correspondingly to the removal of the finished shoe from the lasts.

SUMMARY OF THE INVENTION

The object of the present invention is to provide a last for shoe shafts which works together with a mounted shoe shaft, lateral mold parts and a bottom stamp for molding a sole onto the shoe shaft, and which, in an area corresponding to the sealing lips of the lateral mold parts, has a groove containing a profile strip of elastic material, the profile strip resting against the mounted shoe shaft in such a manner that an undesirable extrusion of sole material as well as impressions from the sealing lips of the lateral mold parts on the shoe shafts are safely prevented, independent of whether or not the shoe shafts have a vamp and also independent of whether or not the lasts are made in one part or have a heel part and a toe part.

According to the invention, the last includes a groove which includes an inlet portion and a guide portion that together provide the groove with generally T-shaped cross section, the groove being located in the last so that the inlet portion extends in parallel with plane in which the cooperating lateral mold parts move (essentially horizontally when the last is vertically oriented) and the mouth of the inlet portion opens onto the surface of the last opposite the sealing lips of the cooperating lateral mold parts; the profile band has a stem part and a foot part that together provide the profile band with an essentially T-shaped cross section, the stem part being positioned in the inlet portion of the groove and the foot part being positioned in the guide portion of the groove; and spring means in the guide portion of the groove to bias the stem part of the profile band towards the mouth of the inlet portion of the groove. As a result of this structure, the profile band rests with essentially constant pressure against the inside of the upper part of the shoe shaft mounted on the last and, on the other hand, it compensates for the thickness variations in the upper parts of the shoe shaft by its movable arrangement in the groove such that a tight fit of the upper parts of the shoe shaft against the sealing edges of the lateral form parts is assured and permanent impressions of the sealing edges on the upper part of the shoe shaft are prevented. By the respective material selected for the profile band and the corresponding setting of the spring tension, it is assured that no undesirable material extrusion of sole material occurs, even along the edges of the vamps on the upper part of the shoe shaft.

The selection of an essentially T-shaped groove in the last has the advantage that the also essentially T-shaped profile band can be pressed into the groove from outside and become permanently positioned within the last. Another advantage is that, because of the T-shaped cross section, it is not necessary to make the last divided in one plane which runs through the inlet portion leading to the surface of the last for the profile band to be inserted into the groove.

Essentially T-shaped means, in the sense of the invention, that deviations from the ideal T-shaped cross section are possible without changing the operational principle of the profile band.

In another embodiment of the invention the profile band is movably arranged essentially without play in the groove. Essentially without play means that the profile band rests with its corresponding surfaces against the groove of the last in such a manner that it can with sensitivity execute the motions parallel to the plane of motion of the lateral mold parts, yet during the mounting of the shoe shafts and during their dismounting it does not shift in the elongated direction of the groove within the last, even after extended operation. This is important, in particular when the last is divided in two and the profile band consists of two sections, one of which is arranged movably in the heel part and the other in the toe part of the last. The profile band can consist of a material with a high friction coefficient. This measure has the effect that a shifting of the profile band along the length of the groove, particularly in a two-part last, is securely prevented. The profile band can consist of an elastomer. This measure has the effect that the profile band can, on the other hand, be easily pressed into the groove of the last and that, on the other hand, it will not move along the length of the groove in the last yet can execute with sensitivity the shifts in the direction of its stem part.

In another embodiment of the invention pressure springs are arranged in the groove so as to contact the side of the foot part of the profile band opposite the stem part. It has surprisingly been shown that this provides for an always secure sealing, even in the area of the edges of vamps on the upper part of the shoe shaft.

The pressure springs can be cylindrical pressure springs, in which case blind bore holes are formed in the last from the guide portion of the groove so that the cylindrical pressure springs will extend therein. The blind bore holes are used for centering the pressure springs, which have portions that protrude from the blind bore holes to press against the profile band.

In another embodiment of the invention pressure springs with two legs can be located in a common plane in the guide portion of the groove. Due to this measure it is not necessary that the last have blind bore holes extending therein from the guide portion of the groove. In the simplest case, each of these pressure springs can consist of a flat profile segment, from the plane of which, in an unstressed state, a tongue is angled off as a second leg, whereby this tongue includes a portion which extends in the plane of the flat profile segment in a block position.

According to another example, the two legs of the pressure spring can be bent from a round profile segment in the manner of a paper clip, whereby they enclosed an acute angle in their working positions. It has surprisingly been shown that in this manner a simple pressure spring is created.

According to yet still another embodiment, the pressure spring is in the form a flexible band which is cut to the respective length and inserted into the groove of the last.

The invention will be better understood by reference to the attached drawings taken in conjunction with the following discussion.

DETAILED DESCRIPTION OF THE PREFERRED EMBODIMENTS

Figure 1:
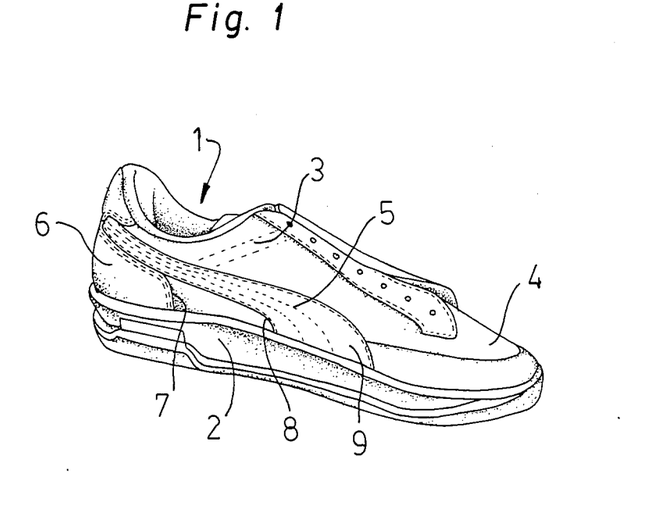
FIG. 1 shows a perspective view of a molded shoe which has lateral vamps, a heel vamp and a toe vamp.

FIG. 1 shows a perspective view of a shoe having a sole 2 and an upper part 3. The upper part 3 has a sewn or stitched on toe vamp 4, a lateral vamp 5 and a heel vamp 6. The depicted heel vamp has a wall thickness of about 1-2 mm, so that along the edge 7 of the heel vamp the total thickness of the upper part is abruptly changed by 1-2 mm. The same situation occurs adjacent the edges 8 and 9 of the lateral vamp 5 and also adjacent the edge of the toe vamp 4.

It can be clearly appreciated from FIG. 1 that when molding the sole 2 to the upper part 3 having the vamps 4-6 thereon, an undesirable extrusion of sole material may occur in the area between the two edges 7 and 8 of the heel and side vamps, especially along their edges. Alternatively, permanent impressions from the lateral mold parts used in the molding process may be made in the heel vamp and in the lateral vamp.

In order to overcome these problems, as mentioned previously it is known to glue a contoured section of aluminum onto the last in the area which corresponds to the area between edges 7 and 8 of the heel and side vamps before mounting the shoe shaft thereon, i.e., in order to compensate somewhat for the lesser thickness of the upper material between the two edges 7 and 8. Another procedure has been to remove material in the last in the area which corresponds to the area between edges 8 and 9 of the lateral vamp so as to form a recess to compensate for the greater total thickness of the shoe shaft in this area.

However, it is easy to appreciate that, based on the great inexactitude in the production of the shoe shafts with lateral vamps, the lateral vamps can never be sewn or stitched in the exact same place on the upper part of the shoe each time, so that a precise alignment of the recess in the last and the area between edges 8 and 9 of the lateral vamp cannot be assured for a series of shoe shafts.

It is also obvious that in cases in which shoe soles have to be molded to upper shoe parts which do not have a corresponding lateral vamp 5, these recesses on the shoe shaft have to be eliminated by an application of material. This applies correspondingly for the heel vamp and the toe vamp.

Figure 2A:
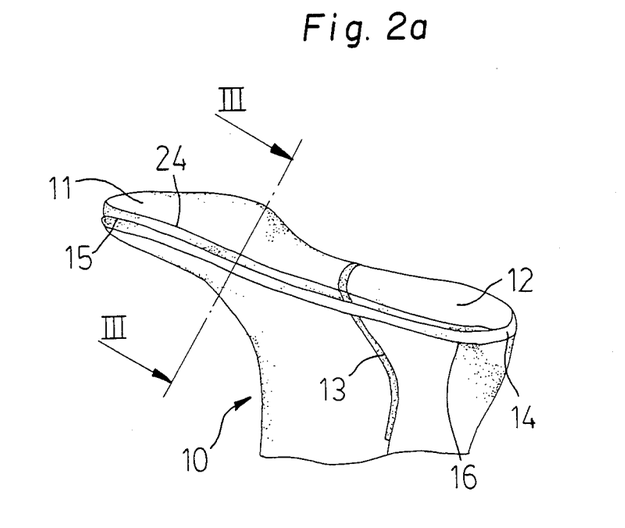
FIGS. 2a and 2b show perspective views of a two-part last constructed according to the present invention, i.e., when in its two end positions.
Figure 2B:
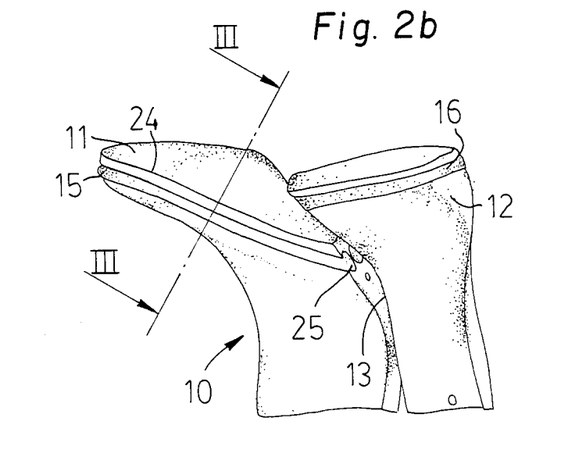

FIGS. 2a and 2b show a split last 10 according to the present invention in its two end positions. The split last consists of a toe part 11 and a heel part 12 which are constructed in such a manner that, along their juncture surface 13, they can be brought from their separated end position shown in FIG. 2b into their joined end position according to FIG. 2a. The motion between these end positions essentially conforms to the movements of a human foot when slipping on a shoe. The toe part and heel part are connected by means of a joint (not shown) inside the last.

FIG. 2a also in effect depicts a single-piece last where the toe part and heel part form a single unit. In case the last is constructed as a single piece, it has a continuous groove in which a flexible profile band 14 is arranged in the manner of the invention.

The invention will be explained on the basis of the split last as shown in FIGS. 2a and 2b. It can be seen that the profile band 14 includes segments 15 and 16, segment 15 being located in the toe part 11 and segment 16 being located in the heel part 12.

Figure 3:
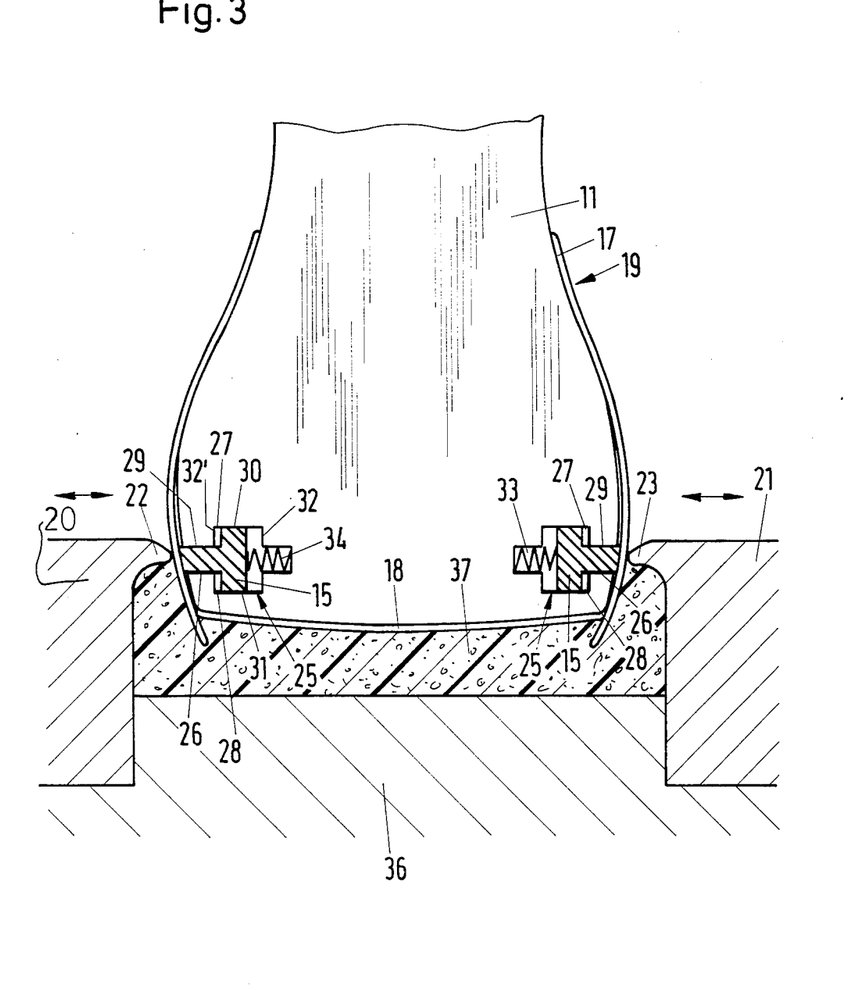
FIG. 3 shows an inverted cross section through the inventive last as shown in FIGS. 2a or 2b and portions of cooperating lateral mold parts and an end stamp, the last being vertically oriented and carrying a shoe shaft whose upper shoe part has a thickness which is thinner than optimum, the cross section through the last being taken through the toe part of the 1st, i.e., as seen along line III—III in either of FIGS. 2a or 2B.
Figure 4:
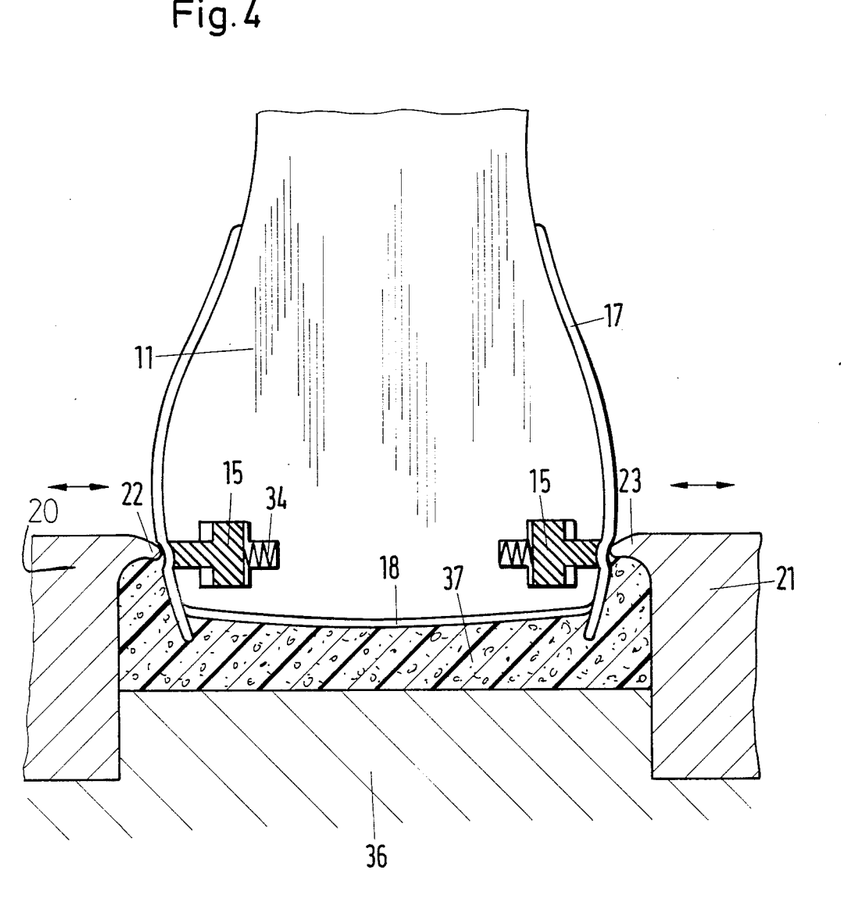
FIG. 4 is a similar view to FIG. 3 but wherein the shoe shaft on the last has a thicker upper shoe part than optimum.
Figure 5:
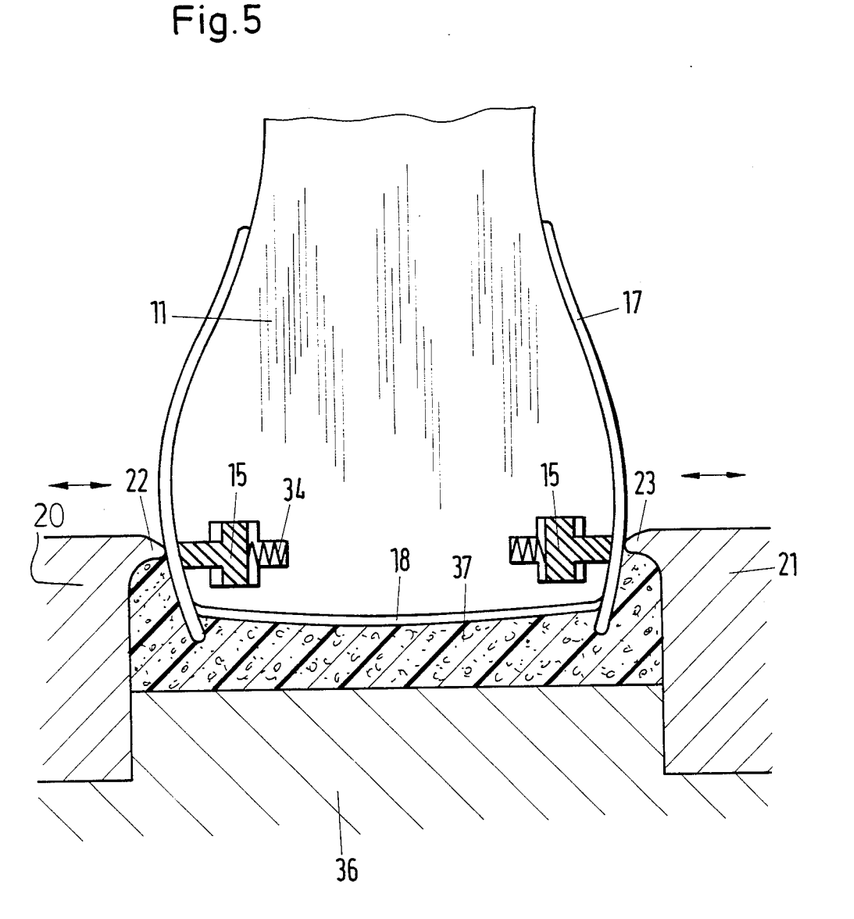
FIG. 5 is a similar view to FIG. 3 but wherein the shoe shaft mounted on the last has an upper shoe part of optimum thickness.

Further explanations of FIGS. 2a and 2b are given on the basis of FIGS. 3 to 5, each of which includes a showing of an inverted cross section according to line III—III in FIGS. 2a or 2b. The same parts have the same reference numbers in all of these figures.

In FIG. 3, 17 designates the upper shoe part and 18 the insole of the shoe shaft 19, which are shown in cross section. The lateral mold parts 20 and 21, also shown in cross section, are in their locked position, i.e., such that they rest against the outer surface of the upper shoe part with their sealing edges 22 and 23.

The toe part has a groove 25 that extends a certain distance inwardly thereof near its edge 24 (see FIGS. 2a, 2b). This groove has an essentially T-shaped cross section and extends all the way around the toe part from contact surface 13 to contact surface 13 and also around the heel part 12 (this can only be seen for a front cross section surface).

As can be seen from FIGS. 3, 4 and 5, the essentially T-shaped groove of the last has an inlet portion 26 which extends in parallel with the direction of motion of the lateral molds (see double arrows in FIGS. 3 to 5), or essentially horizontally when the last is vertically oriented. To this inlet portion 26 is joined the guide portion defined by two legs 27 and 28, which legs extend at right angles to the inlet portion 26.

In this essentially T-shaped groove the segment 15 of the profile band is arranged, the profile band including a stem part 29 which extends into the inlet portion 26 of the groove and a foot part defined by two legs 30 and 31 which extend into the two legs 27 and 28 of the guide portion of the groove.

From FIGS. 3 to 5 it can be seen that the stem part 29 of the profile band is higher (measured horizontally in FIGS. 3-5) than the inlet portion 26 of the groove, while the thickness and height of the stem part of segment 15 and of the groove are essentially the same, so that there is a practically playless guidance of the bridge of segment 15. The length of the profile band (measured vertically to the drawing direction) corresponds to the length of the groove in the toe part.

The height of the foot part of the profile band is less than the height of the guide portion of the groove, whereby the surfaces 32 and 32' of the legs of the guide portion of the groove form stops for the legs 30 and 31 of the foot part of the segment 15 of the profile band. Blind bore holes 33 are built into the last from the guide portion of the groove in which cylindrical pressure springs 34 are arranged and rest under tension against the profile band.

In FIG. 3 (also FIGS. 4 and 5) the lateral mold parts in their locked position enclose an opening into which extends the bottom stamp 36 from below, which, together with the mounted shaft, delineates the mold cavity 37 into which the material for the outer sole is injected. The same applies if the sole consists of an outer sole and an intermediate sole.

In FIG. 3 it is assumed that the wall thickness of the upper shoe part is less than the given thickness of the model (optimum) shaft. For this reason, due to the spring tension of springs 34, the stem part of the profile band 15 rests against the inside surface of upper part of the shoe shaft and presses it with allowable pressure against the sealing lips 22 and 23 of the lateral mold parts in such a way that an undesirable extrusion of sole material in the direction of the upper part of the shoe shaft above the sealing lips of the lateral mold parts is prevented and the sealing lips do not leave a permanent mark after the removal of the shoe from the shoe soling machine.

In FIG. 4 the wall thickness of the upper part of the shoe is greater than the model wall thickness. For this reason the pressure exerted on the upper shoe part by the lateral mold parts in their locked position has the effect that, in the area of the groove of the last, it pushes the material of the upper shoe part into the inlet portion of the groove in the last so that the profile band is displaced towards the surface 32 formed by the legs of the guide portion of the groove, so that no inadmissibly high surface pressure will be exerted by the sealing edges of the lateral mold parts. The pressure exerted on segment 15 of the profile band by the spring tension has the effect that the upper part of the shoe in the area of the groove rests in a sealing manner against the sealing edges of the lateral mold parts, so that an undesirable extrusion of sole material is also not possible.

FIG. 5 shows, as in the representations of FIGS. 3 and 4, a shoe shaft, the wall thickness of which however corresponds to the wall thickness of an ideal shoe shaft, i.e., of a shoe shaft which has a uniform thickness all over. As can be seen from FIG. 5, the upper part of the shoe shaft in the area of the groove rests against the profile band without any transition.

From FIGS. 3 to 5 it can be easily seen that it is necessary that the inlet portion of the groove as well as the stem part of the profile band have a height determined by experimentation so that inexactitudes in the adjustment of the last with the mounted shaft can be easily self-corrected.

It is also easily possible to reduce or expand the thickness of the sole to be formed by a respective adjustment of the height of the inlet portion of the groove and the stem part of the profile band by a corresponding height adjustment of the last with mounted shoe shaft before the injection of the sole material into the mold cavity.

FIGS. 6a, 7a, 8a, 9a and 10a show lateral views of pressure springs which can be used in the inventive last, and FIGS. 6b, 7b, 8b, 9b and 10b show corresponding top views thereof.

Figure 6A:
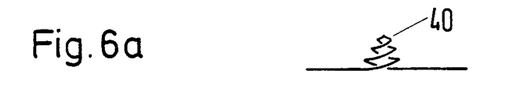
FIGS. 6a and 6b show respective side and plan views of a first type of pressure spring element which can be used in the last of the present invention.
Figure 6B:
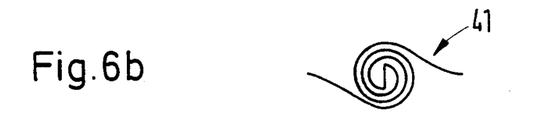

FIG. 6a shows a pressure spring 40 constructed as a cone that has been formed according to FIG. 6b from a wire 41 which has been bent out of a plane and spirally wound.

Figure 7A:
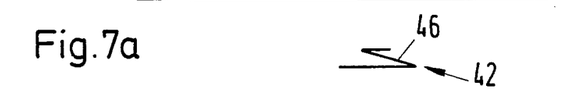
FIGS. 7a and 7b show respective side and plan views of a second type of pressure spring element which can be used in the last of the present invention.
Figure 7B:
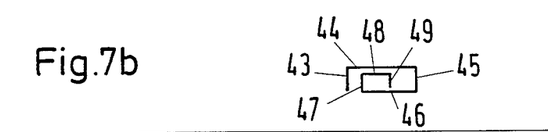

FIGS. 7a and 7b show a pressure spring 42 which is bent, according to the principle of the paper clip, from a wire segment (round profile segment). The legs 43, 44 and 45 are bent in the manner of an open U, while, as seen in FIG. 7a, the segment 46 is bent at an acute angle to the plane defined by segments 43, 44 and 45, and the segments 47, 48 and 49 form an open U in a plane parallel to that formed by legs 43—45 which rests against the side of the foot part of the profile band opposite from the stem part.

Figure 8A:
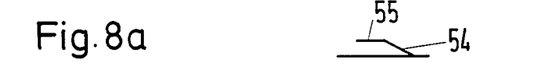
FIGS. 8a and 8b show respective side and plan views of a third type of pressure spring element which can be used in the last of the present invention.
Figure 8B:
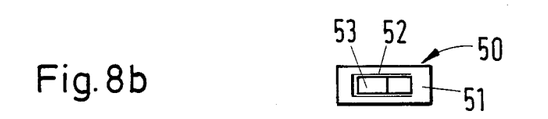

FIGS. 8a and 8b show a pressure spring 50 consisting of a rectangular flat profile segment 51 which has a U-shaped slit 52 that forms a tongue 53 that is bent out of the plane of the flat profile while forming the two portions 54 and 55, whereby portion 55 extends essentially parallel to segment 51 and rests against the side of the foot part of the profile band opposite the stem part.

Figure 9A:
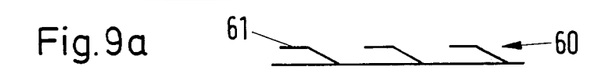
FIGS. 9a and 9b show respective side and plan views of a portion of a fourth type of pressure spring element which can be used in the last of the present invention.
Figure 9B:
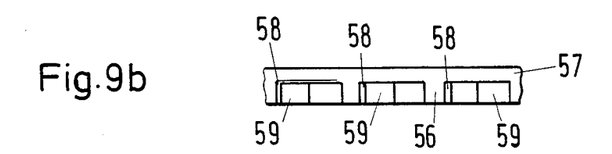

FIGS. 9a and 9b show a variation of the pressure springs according to FIGS. 8a and 8b wherein in each case L-shaped slits 58 are worked into one edge 56 of a flat profile segment or flat band 57 while forming tongues 59, whereby these tongues are bent out of the plane of the flat band while forming portions 60 and 61, the portions 61 resting against the foot part of the profile band similarly to the pressure springs according to FIGS. 8a and 8b. FIGS. 9a and 9b show the formation of a band segment with several pressure springs.

Figure 10A:
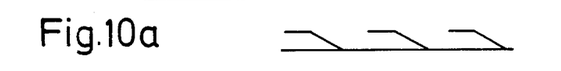
FIGS. 10a and 10b show respective side and plan views of a portion of a fifth type of pressure spring element which can be used in the last of the present invention.
Figure 10B:
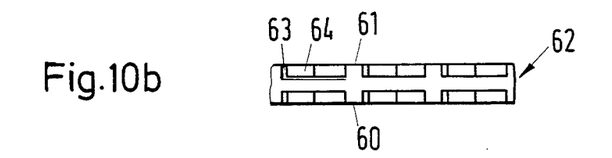

FIGS. 10a and 10b show a variation of the band with pressure springs according to FIGS. 9a and 9b wherein the two opposite edges 60 and 61 of a flat band 62 have L-shaped cuts 63, starting from both edges, while forming tongues 64 which are angled according to the portions 54 and 55 in FIGS. 8a and 8b and 61 and 62 in FIGS. 9a and 9b.

Rubber is particularly well suited for the profile bands as such profile bands easily fully adapt to the upper part of the shoe, independent of their having a vamp or not and whether or not the heel part is reinforced and thus relatively inflexible or not.

It is a particular advantage that with the last according to the invention a change of sole thickness is possible so that it is essentially possible to use the same last for the production of soles for either winter shoes and summer shoes.

I claim:

1. In a last for supporting a shoe shaft and which is cooperable with lateral mold parts and a bottom stamp for molding a sole onto a shoe shaft mounted on the last, the last having a groove therearound that extends inwardly from a side surface thereof, and a profile band of flexible material which is movably positioned in the groove and which can contact a shoe shaft mounted on the last opposite where sealing edges of the lateral mold parts will contact the shoe shaft, said last including spring means for biasing said profile band towards said side surface thereof and against a shoe shaft mounted on the last, the improvement wherein (a) said groove is formed by a linear inlet portion which communicates with the side surface of said last and a guide portion which is formed by two oppositely-extending legs that are oriented perpendicularly to said linear inlet portion, thereby providing said groove with a generally T-shaped cross section, said linear inlet portion being horizontally oriented when said last is vertically oriented and said legs of said guide portion providing opposite stopping surfaces which extend perpendicularly to said linear inlet portion, and (b) wherein said profile band includes a linear stem part and a foot part which is formed by two oppositely-extending legs that extend perpendicularly to said linear stem part, thereby providing said profile band with a generally T-shaped cross section, said stem part of said profile band being positioned in said inlet portion of said groove and said foot part of said profile band being positioned in said guide portion of said groove, said profile band being dimensioned to be movable without lateral play within said groove toward and away from said side surface of said last, said legs of said profile band being movable between opposite stopping surfaces of said legs of said guide surface of said groove.

2. A last according to claim 1, wherein said profile band is composed of a material which has a high friction coefficient.

3. A last according to claim 2, wherein said material is an elastomer.

4. A last according to claim 2, wherein said material is polyurethane.

5. A last according to claim 1, wherein said spring means comprises a plurality of pressure springs located in the guide portion of the groove for contacting the foot part of said profile band and biasing the stem part of said profile band towards the side surface of said last.

6. A last according to claim 5, wherein each pressure spring comprises a cylindrical pressure spring and wherein said last includes blind bore holes which extend therein from the guide portion of said groove, said cylindrical pressure springs extending into said blind bore holes.

7. A last according to claim 5, wherein each said pressure spring comprises a wire segment which has been bent to form two portions that extend in parallel planes and a connecting segment therebetween.

8. A last according to claim 6, wherein said connecting segment extends at an acute angle to said two portions.

9. A last according to claim 5, wherein each said pressure spring comprises a wire formed into a truncated cone.

10. A last according to claim 5, wherein each said pressure spring comprises a flat rectangular plate and a tongue which extends away from said plate, said tongue having a tip portion which extends in parallel with said flat rectangular plate.

11. A last according to claim 1, wherein said spring means comprises a pressure spring in the form of a flexible band located in the guide portion of the groove to contact the foot part of the profile band and bias the stem part of the profile band towards the mouth of the inlet portion of the groove.

12. A last according to claim 1, wherein said stem part of said profile band has a greater height than the inlet portion of said groove.

* * * * *